June 29, 1954  I. W. DILLON  2,682,589
THERMOSTATIC CONTROL FOR HIGH-TEMPERATURE
Filed Nov. 2, 1950  3 Sheets-Sheet 1
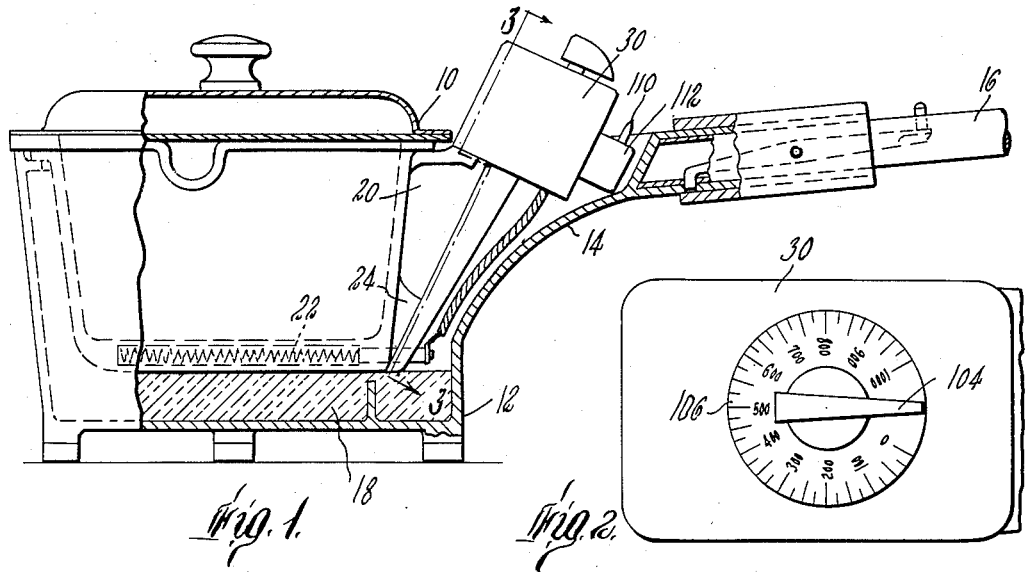
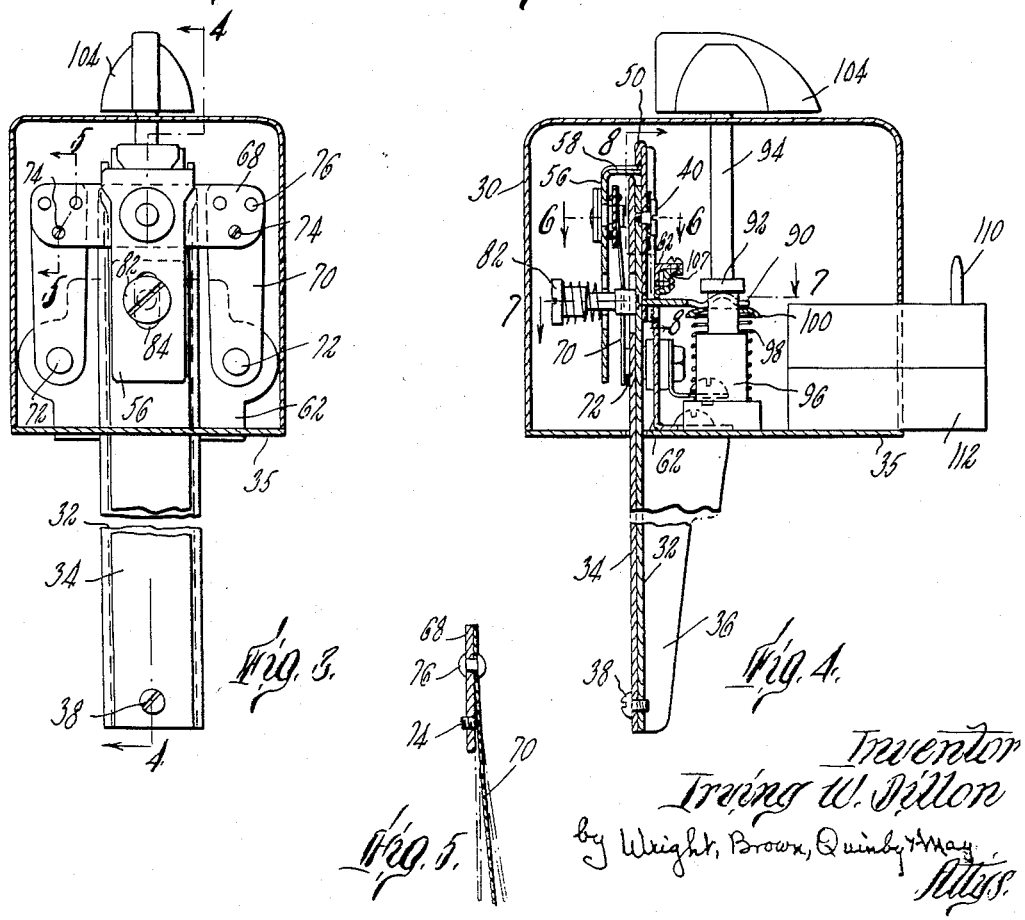
Inventor
Irving W. Dillon
by Wright, Brown, Quinby & May
Attys.

June 29, 1954 — I. W. DILLON — 2,682,589
THERMOSTATIC CONTROL FOR HIGH-TEMPERATURE
Filed Nov. 2, 1950 — 3 Sheets-Sheet 2
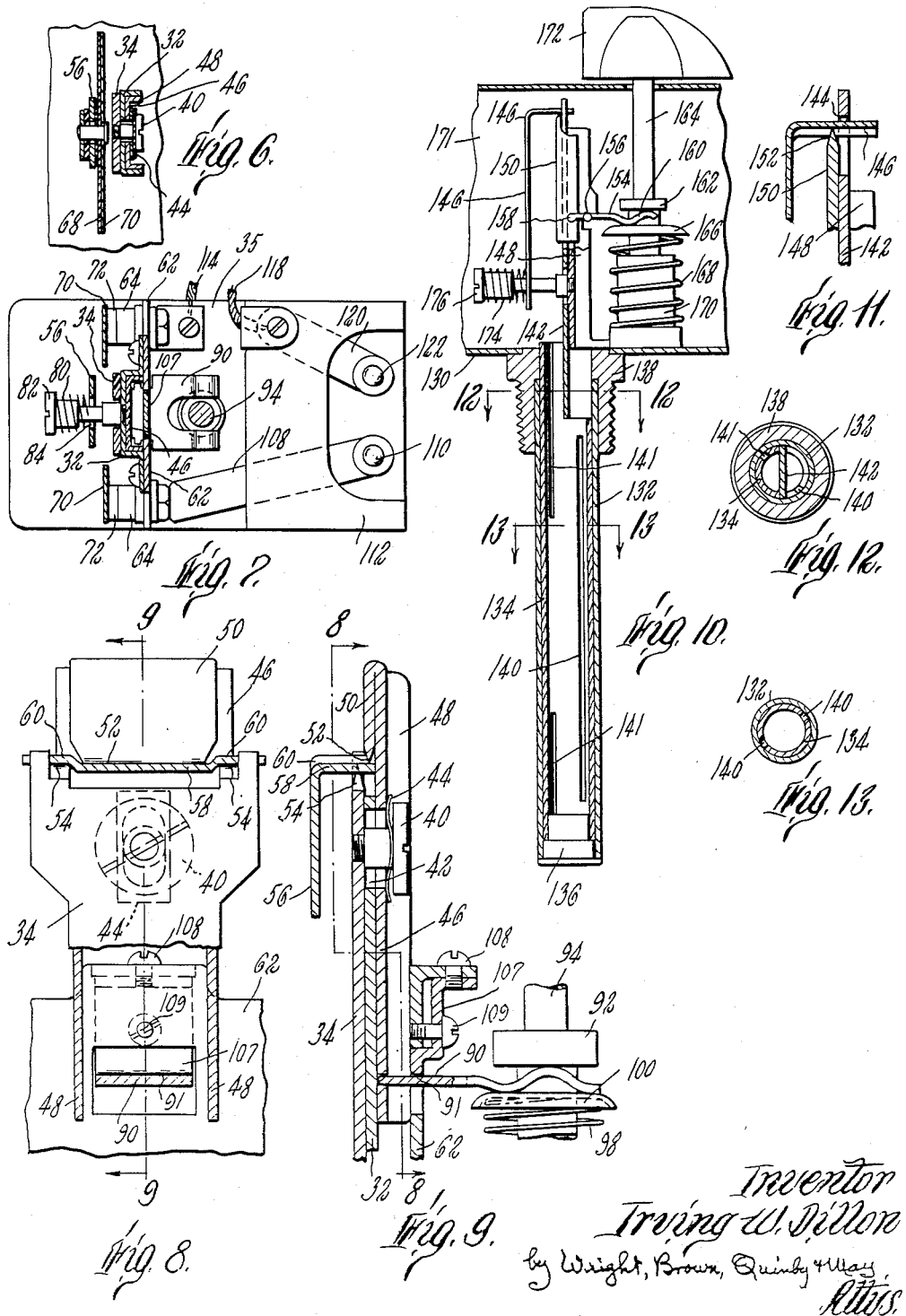
Inventor
Irving W. Dillon
by Wright, Brown, Quinby & May
Attys.

June 29, 1954     I. W. DILLON     2,682,589
THERMOSTATIC CONTROL FOR HIGH-TEMPERATURE
Filed Nov. 2, 1950     3 Sheets-Sheet 3
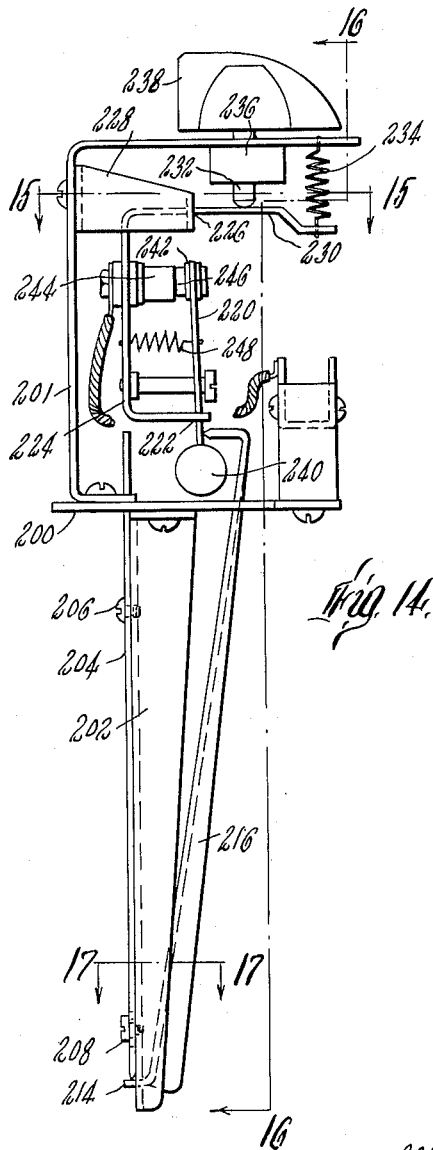
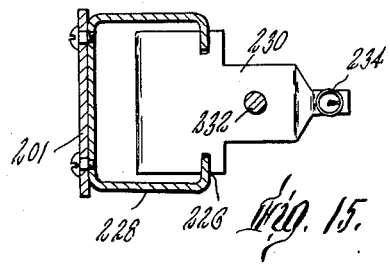
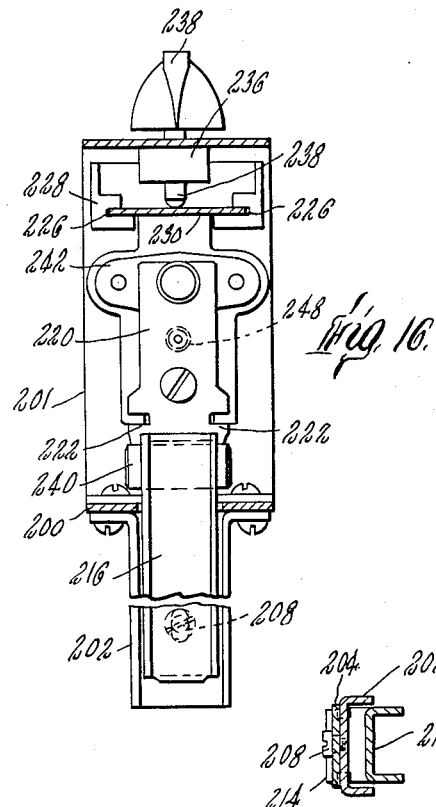
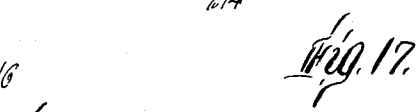
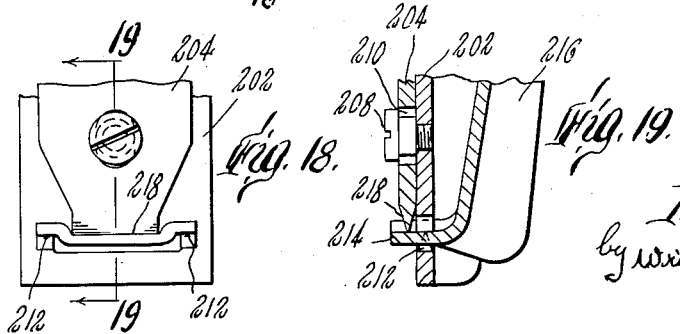
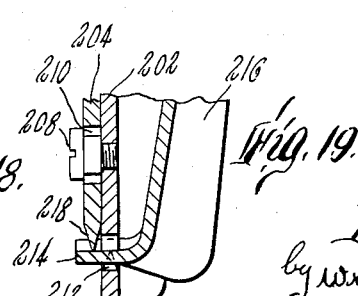
Inventor
Irving W. Dillon
by Wright, Brown, Quinby & May
Attys.

Patented June 29, 1954

2,682,589

UNITED STATES PATENT OFFICE 2,682,589

THERMOSTATIC CONTROL FOR HIGH TEMPERATURES

Irving W. Dillon, Melrose, Mass., assignor to Loui B. Dillon, Melrose, Mass.

Application November 2, 1950, Serial No. 193,719

12 Claims. (Cl. 200—139)

This invention relates to a thermostatic control adapted to operate reliably at temperatures up to or above 1500° F. in regulating a heating unit to maintain the object heated at a substantially uniform temperature by automatically turning on and off an electric current or other source of energy employed to supply the heat.

Present types of thermostatic controls using bimetal or other expansive elements which are forced out of their normal plane when subjected to elevated temperatures are not practical for operation at temperatures of 1000° F. or over and in general should be operated at temperatures well below this point. When the temperature of such elements is increased, deflection from the normal plane takes place while at the same time the strength of the material decreases. At 1000° F. the strength of materials suitable for this work is less than 50% of their strength at room temperature while at 1500° F. it is less than 20%. Bending stresses imposed on bimetal or other elements which bend out of their normal plane when subjected to elevated temperatures are greater than the bending strength of the materials at temperatures above 1000° F. and at such temperatures the element will take a permanent set thus destroying the calibration of the control.

In order to operate successfully at temperatures of 1000° F. and over without damage to the elements, the design must be such that there will be no bending from the normal plane and that any stress placed on the elements will be less than the elastic limit of the material. This means that only the normal linear expansion or contraction of the element when subjected to varying degrees of heat may be used. As the difference in expansion between so called high and low expansion elements is very low per degree F., means must be supplied to multiply greatly this difference in expansion in order to obtain sufficient motion to operate a switch mechanism with one or two degrees variation in temperature. The ratio of multiplication should not be less that 30 to 1 for effective operation.

The temperatures of the elements which supply the energy to operate the control must be kept as nearly equal as possible; otherwise the control will operate at temperatures over or under that for which it is adjusted. This can be accomplished only when both elements are in contact with one another over a substantial portion of their surfaces.

It is an object of the invention to provide a control which meets these conditions, which will operate successfully up to and above 1500° F., which will handle power up to 2000 watts at 120 volts without use of a relay, is reasonably sensitive in action, responds to temperature changes throughout its entire range with uniform accuracy, is sufficiently compact to permit use on small portable equipment, operates equally well on any unit where it is installed, and is sufficiently rugged to maintain accuracy when subjected to shock or vibration such as may be encountered in the handling of portable equipment or where installed on power machinery such as plastic molding machines.

To accomplish this the invention provides a thermostat wherein the longitudinal thermal expanding force of an element is employed to operate a switch, a yielding auxiliary means such as a spring or the force of gravity being employed to close the switch when the temperature drops below the prescribed figure for which the thermostat has been adjusted.

Two sets of contacts arranged in series permit the handling of currents up to 2000 watts at 120 volts without danger of arcing and provide safety against overheating. If one set of contacts should happen to stick, there is sufficient power in the elements to open the other and the control will operate on one set of contacts with only a slight rise in operating temperature. The use of double contacts in series also eliminates the necessity of using flexible leads to carry the current from one side of the line to the movable contact or of using part of the mechanism as a conductor either of which can affect the calibration of the control as even the most flexible wire obtainable sufficiently heavy to carry 20 amps. has sufficient tension to affect the action of light switch mechanisms.

Sensitivity may be increased in the control by hammering the high expansion material under a drop hammer so as to obtain a closer grain structure and to increase stiffness and also by oxidizing the surfaces of the high and low expansion elements to increase the rate of heat transmission from one to the other. According to the invention, two elongated elements of metals or alloys having different coefficients of linear thermal expansion are secured in face-to-face engagement, the elements being fastened together at or near one end thereof and mutually free at the other end for different amounts of movements of the free ends in the direction of the length of the elements in accordance with changes of temperature of the elements. By making the elements of different metals suitable for temperatures in the desired range as, for example, different types of steel, a thermostat can be had which will operate accurately at temperatures far above the maximum at which bimetallic bars will operate reliably.

Various advantageous features of the invention will be apparent from the following description of certain embodiments thereof and from the drawings of which—

Figure 1 is a side elevation of a ladle and support containing an embodiment of the invention, a portion being broken away to show in section;

Figure 2 is a plan view of the thermostat shown in Figure 1, on a larger scale;

Figure 3 is a section on the line 3—3 of Figure 1;

Figure 4 is a section on the line 4—4 of Figure 3;

Figure 5 is a section on the line 5—5 of Figure 3;

Figure 6 is a section on the line 6—6 of Figure 4;

Figure 7 is a section on the line 7—7 of Figure 4;

Figure 8 is a section on the line 8—8 of Figures 4 and 9;

Figure 9 is a section on the line 9—9 of Figure 8;

Figure 10 is a sectional view of a modified form of the invention, the electrical elements being omitted;

Figure 11 is a sectional detail of the apparatus shown in Figure 10, on a larger scale;

Figure 12 is a section on the line 12—12 of Figure 10;

Figure 13 is a section on the line 13—13 of Figure 10;

Figure 14 is a side elevation of another modified form of the invention;

Figure 15 is a section on the line 15—15 of Figure 14;

Figure 16 is a section on the line 16—16 of Figure 14;

Figure 17 is a section on the line 17—17 of Figure 14;

Figure 18 is a rear elevational view of the lower portion of the device shown in Figure 14, on a larger scale; and Figure 19 is a section on the line 19—19 of Figure 18.

For convenience in describing the relative positions of the parts in the various embodiments of the invention illustrated on the drawings, each thermostat will be thought of as occupying a vertically upright position such as is indicated in Figures 4, 10, and 14, but it is to be understood that in actual use the unit can be mounted either in such vertical position or inclined as illustrated in Figure 1, or in a horizontal position such as it would occupy if the thermal expansion elements were inserted through an aperture in the side wall of an oven.

Figure 1 illustrates one of many uses for thermostats of the type embodying the invention. As shown, a ladle or crucible 10 of iron or steel is mounted in a casing 12 which has a lateral projection 14 adapted to receive a removable handle 16 by which the ladle assembly can be lifted. Between the ladle 10 and the surrounding casing 12 is packed heat-insulating material 18 such as fibre glass except for a space 20 left in the lateral projection 14. Embedded in the bottom of the ladle is a heating element 22 shown as an electric resistance coil. A lug 24 projects from the wall of the ladle into the space 20 in the casing projection and is preferably integral with the ladle wall. A thermostat is mounted on said casing projection and includes a housing 30 and elongated expansion elements 32 and 34 which extend down into the space 20, the lower portion of the element 34 being arranged to fit firmly against the lug 24 so as to receive heat therefrom by conduction. The upper part of the thermostat which includes a control device such as an electric switch and mechanism for operating the switch in response to predetermined temperature changes, as hereinafter described, is at the top of the casing projection 14 where it can be kept relatively cool.

One form of thermostat embodying the invention is illustrated in Figure 1-9 inclusive. The expansion elements 32 and 34 are preferably of different kinds of steel having different coefficients of linear thermal expansion, the use of the proper kinds of steel making it possible to employ the thermostat in controlling temperatures of the order of 1000 to 1500 degrees F. and higher with reliable accuracy. For example, the low expansion element may be made of chrome steel containing 11% chrome, and the high expansion element may be made of chrome-nickel steel containing 18% chrome and 8% nickel. These materials are given merely by way of illustration, it being understood that a wide variety of special steels and other alloys are available for use in thermostatic elements.

In the embodiment of the invention illustrated in Figure 1-9, the expansion element 32 having the lower coefficient is the main frame member which supports the housing 30 and the operating elements within the housing. Secured to this frame is a platform 35 on which the housing rests. The portion of the frame 32 which extends down below the platform is preferably provided with side flanges 36 for purposes of rigidity so that a comparatively thin gauge of metal can be employed without danger of undesirable flexing or warping. The high expansion element 34 is a flat strip having firm but slidable face to face engagement with the element 32 and is secured thereto at the lower end only as by a screw 38, a spot weld, or equivalent fastening element. The upper portions of the elements 32 and 34 are mutually free for relative longitudinal movement in response to unequal linear expansion or contraction when the temperature of the elements rises or falls. In order to hold the elements 32 and 34 in firm interfacial contact, a screw 40 may be provided to extend through an aperture 42 in the element 32 and to be threaded into a hole in the element 34 as indicated in Figure 9. Under the head of the screw 40 is a spring washer 44 which is compressed by the screw to maintain the element 34 firmly but yieldingly against the element 32 so that heat can be quickly transferred by conduction from one element to the other to equalize the temperatures of the elements. The elements 32 and 34 are preferably made of sheet stock which is as thin as possible consistent with the requirements of necessary stiffness, this being for the purpose of making the device quick-acting by as little heat as possible to raise or lower the temperature of these elements to keep in step with the temperature of the ladle and its holder. This results in quick responses to changes of temperatures in the ladle.

As shown best in Figure 9, the length of the frame 32 is augmented by an adjustable piece 46 at its upper end. This extension is provided with side flanges 48 for stiffness and is held against the upper portion of the frame 32 by the screw 40 which presses the spring washer 44 directly against the face of the extension 46. The extension 46 is thus a virtual part of the frame 32 but is adjustable by means hereinafter described to vary slightly the overall length of the frame.

The upper end portion of the extension 46 is doubled back as at 50 so that the extremity points downward as indicated in Figure 9. This extremity is shaped into the form of a knife edge bearing 52. In like manner the upper extremity of the high expansion element 34 is shaped into the form of an upwardly pointing knife edge bearing 54 which for convenience is made in two spaced sections as indicated in Figure 8. When properly adjusted, the bearings 52 and 54 are in a common horizontal plane. The bearing 52 serves as the fulcrum for a lever 56 which has a portion 58 extending horizontally between the edges of the bearings 52 and 54. The horizontal portion 58 of the lever 56 has upwardly offset margins 60 as indicated in Figure 8. The knife edge sections 54, as shown in Figure 8, engage under these raised marginal portions 60 so that the edges 52 and 54 can conveniently be in a common horizontal plane. The lever 56 can be horizontal for its entire length if desired, but for purposes of compact structure it is shown as having an L shape, the horizontal portion 58 being the short arm of the L, the long arm of the L extending downward approximately parallel to the expansion elements 32 and 34. The movements of the lever 56 operate a suitable control device such as the electric switch illustrated on the drawings and hereinafter described. As shown in Figure 9, the horizontal spacing between the fulcrum 52 and the bearing edges 54 can be made very small in comparison with the length of the lever 56 so that a mechanical advantage of considerable size can be realized. For example the bearing edges 52 and 54 can be spaced apart .05 inch which is 1/30 of the length of a lever having an effective length of 1½ inches. In such case, the fulcrum 52 being fixed, any vertical movement of the bearing 54 would be multiplied thirty times at the free end of the lever 56.

Mounted on the platform 35 is a fixed bracket 62 which carries electric terminals 64 (Figure 7), these terminals being insulated from the bracket by suitable bushings. The rocking lever 56 carries a cross head 68 (Figure 3) which is insulated from the lever by mica bushing and washers. To the end portions of the cross-head 68 are attached a pair of resilience arms 70 projecting down therefrom and carrying at their lower ends suitable contact elements 72 for contact with the terminals 64 respectively. The cross head and its arms are thus a conductor connecting the elements 72. When the long arm of the lever 56 is swung toward the left from the position shown in Figure 4, the arms 70 are swung with it to disconnect the contact elements 72 from the respective terminals 64, thus breaking the circuit simultaneously at two points. This arrangement is effective in minimizing the arcing at the switch points when the circuit is broken. In order to insure simultaneous breaking of the circuit at the two points, each of the individual arms 70 may be adjusted with reference to the cross head 68 by a set screw 74 which is threaded through the cross head and bears against the arm at a point spaced from the point 76 of attachment of the conductor to the cross head (Figure 5). Any desired means, such as rivets, may be employed to attach the arms 70 to the cross head. The screws 74 can be used to adjust one or both arms 70 in such a way as to cause the contact points 72 to move into and out of contact with the terminals 64 simultaneously when the lever 56 is rocked.

It is evident from Figure 9 that a rise of temperature in the expansion element 34 will cause the bearing 54 at the upper extremity of the element 34 to move upward and hence to rock the lever 56 toward the left. The effect of this rocking movement is to disconnect the contact points 72 from the terminals 64 and thus to break the circuit. Thus the positive expanding action of the expansion element 34, which is capable of exerting a force running into hundreds of pounds, results in the opening of the switch. In order to provide for the closing of the switch when a drop in temperature results in the contraction of the element 34, a compression spring 80 (Figure 7) may be mounted on a bolt 82 which extends through an opening 84 in the lever 56, the bolt 82 being secured to the fixed frame 32. The spring 80 is compressed between the head of the bolt 82 and the long arm of the lever 56 so that it constantly pushes the lever 56 toward the right and presses the short arm of the lever down against the bearing 54. Hence the spring 80, aided by gravity, is utilized to close the switch when the element 34 shrinks because of a drop in temperature.

In order to adjust the thermostat for operation of the switch at different temperatures, the extension 46 of the stationary element 32 is adjusted up or down so as to raise or lower the fulcrum 52. This may conveniently be accomplished by a rocking lever 90 (Figure 9) which rocks on a fulcrum 91 carried by the fixed bracket 62. One end of this lever engages in a slot in the extension 46. The other end engages under a collar 92 of an adjusting screw 94 which is threaded into a nut 96 mounted on the platform 35. A spring 98 which surrounds the nut 96 presses against a washer 100 which in turn pushes upward against the lever 90 to hold it against the collar 92. The collar 92 is an adjustable stop which, in any position of adjustment, rigidly prevents any downward movement of the extension 46 relative to the frame member 32 which would decrease the overall length of the frame member and extension. As shown in Figure 4, the shank of the adjusting screw 94 extends up through the top of the housing 30 and has a suitable finger piece 104 by which it can conveniently be rotated. A suitable scale 106 may be provided on the top of the housing 30 as indicated in Figure 2 to cooperate with the finger piece 104, this scale being preferably calibrated to read in terms of temperatures at which the thermostat will act to open the switch. The adjustive turning of the finger piece 104 and screw 94 results in a raising or lowering of the fulcrum 52. If, for example, the fulcrum is raised, additional expansion of the expansible element 34 will be necessary to rock the lever 56 so as to open the switch. Hence, the thermostat will thus operate at a higher temperature. Conversely a lowering of the fulcrum 52 results in a lowering of the temperature at which the thermostat will operate.

It has been found that in calibrating the thermostat when installed under different conditions of operations as for example on a ladle or in an oven, the required size of the scale divisions on the dial 106 may be different. To avoid the necessity of providing a plurality of dial plates 106, provision is made for shifting the fulcrum 91 about which the lever 90 rocks. For this purpose, the bracket 62 carries at its upper end an adjustable member 107 (Figure 9), the lower end of which is the fulcrum 91. The member 107 is secured to the bracket 62 by two screws 108 and 109. The screw 109 extends through the member 107 and is in threaded engagement with the bracket 62. To adjust the fulcrum 91 to the right or left, the screw 108 is loosened, then the screw 109 is turned one way or the other according to the direction of adjustment. The member 107 is preferably of a material which has a stiff resilience so that the member can be sprung to some extent.

The lever 56 is preferably so shaped that when the contact elements 72 are touching the terminals 64 the points of the lever with the bearings 52 and 54 will be in the same horizontal plane.

The terminals 64 may be connected in the electric circuit by suitable conductors, one of them being connected, as indicated in Figure 7, by a conductor 106 to a terminal 110 in a block 112 of insulation. The other switch terminal 64 is connected by a wire 114 to the heating element 22 under the ladle 10. The other end of the heating element is connected by a wire 118 and conductor 120 to a terminal 122 in the block 112.

A modified form of thermostat is illustrated in Figures 10–13. This thermostat comprises a base plate or platform 130 from the bottom of which projects downward a tubular expansion element 132 which has a relatively high coefficient of linear thermal expansion. Slidably nested within the tubular element 132 is a tubular element 134 having a comparatively low coefficient of thermal expansion. These tubes are permanently secured together at their lower ends by being welded, riveted or otherwise secured to a block 136. The high expansion element 132 is rigidly attached to the base plate 130 by any suitable means such as a thimble 138 to which the upper end of the tube 132 is welded or otherwise firmly secured, the thimble itself being secured to the bottom of the plate 130. As shown, the thimble is externally screw threaded to facilitate the mounting of the thermostat with the elements projecting through an aperture in a wall which is internally threaded to receive the threads of the thimble. Thus, for example, the wall of a pressure vessel (not shown) may be provided with an internally threaded aperture to receive the thimble 138, the elements 132 and 134 thus being disposed inside of the vessel where they are exposed to the internal temperature thereof, the working parts of the thermostat being outside of the oven and therefore in a relatively cool place. The inner tube 134 is closely fitted within the tube 132 so as to have firm interfacial contact therewith. In order to prevent binding, the inner tube may be longitudinally slotted as at 140 and 141 so that resilient pressure is maintained between the contact faces of the tubes 132 and 134. This promotes rapid interchange of heat between the two elements so that a change in temperature of one element is quickly transmitted to the other and minimizes such inequalities in the temperatures of the two elements as might temporarily affect the accuracy of operation of the thermostat as a whole. For correct responses to temperatures in the object to be regulated, it is necessary that the two elements 132 and 134 be substantially evenly heated since if there is a material lag in the inner tubular element in responding to a change of temperature, the instrument will operate sooner or later than it should.

Since the high expansion element 132 is rigidly attached at its upper end to the base plate 130, it may be regarded as the stationary element in this form of the invention. When the high expansion element 132 expands, its lower end moves downward carrying with it the low expansion element 134. Thus an increase of temperature results in a downward movement of the upper end of the lower expansion element. This element is provided with an upstanding extension 142 having a fulcrum 144 near its upper end. This fulcrum is preferably in the form of a downwardly directed knife edge which engages on the marginal portions of a horizontal arm of a lever 146. The base plate 130 carries an upstanding bracket 148 having an adjustable extension 150 at its upper end. The upper extremity of the extension 150 is a knife edge bearing 152 which engages the under face of the horiontal arm of the rocking lever 146. In order to adjust the extension 150 vertically, a lever 154 is pivoted at 156 on the bracket 148, one end 158 of the lever 154 engaging the extension 150, the other end 160 of the lever 154 being confined between a collar 162 on an adjusting screw 164 and a washer 166 pressed upward by a spring 168 which is disposed around a nut 170 fixed on the base plate 130. The upper end of the shank of the adjusting screw 164 projects up through a housing 171 and carries a finger piece 172 which can be turned manually to adjust the temperature at which the thermostat will operate, a scale being preferably provided similar to that shown in Figure 2. The lever 146 extends downward and is spring pressed by a spring 174 confined by a bolt 176 similar to the bolt 82 previously described. To avoid confusion of detail, the electric elements have been omitted from Figure 10 but may be similar to those shown in Figures 3 and 4.

Another modified form of the invention is illustrated in Figures 14–19 inclusive. To a base plate 200 a bracket 201 and an elongated frame member 202 are secured. The frame 202 is provided with flanges for rigidity and has a comparatively low coefficient of thermal expansion. A strip 204 of metal having a comparatively high coefficient of thermal expansion is secured in face to face contact with the frame 202 by a screw 206 or other suitable means which secures the elements together near their upper ends, and a screw 208 which projects through a slot 210 in the element 204 and is threaded into the frame 202 (Figure 19) to hold the lower portions of these parts in firmly pressed sliding engagement. Since the expansive force of the element 204 is of the order of several hundred pounds, the interfacial friction between the elements 202 and 204 does not appreciably affect the accuracy of the instrument. In this embodiment of the invention, the frame 202 carries a fulcrum 212 near its lower end, this fulcrum being directed upward and engaging under the margins of the horizontal short arm 214 of a lever 216. The lower end of the high expansion element 204 is a knife edge bearing 218 which is directed downward and bears on the horizontal portion 214 of the lever 216 at a point closely adjacent to the fulcrum 212. The lever 216 extends up through the plate 200, its upper end engaging against a rocking lever 220 which is pivoted at 222 to the lower end of a rockably adjustable frame 224, the latter being suspended as at 226 from a pair of brackets 228 mounted on the bracket 201. The frame 224 has an upper horizontal portion 230 which is pressed against an adjusting screw 232 by a spring 234 attached to the end of the horizontal portion 230 of the lever and also to the top of the bracket 201. Thus when the adjusting screw 232 which is screw threaded through a fixed nut 236 is turned by manipulation of the finger piece 238, the frame 224 is adjustably rocked about its points of support 226 so as to move its lower portion toward or from the upper end of the rocking lever 216 so as to adjust the point at which the lever 216 becomes effective to rock the lever 220.

The lever 220 is provided with a counterweight 240 at its lower end and a cross head 242 at its upper end, this cross head being of metal and being electrically insulated from the lever 220 so as to serve as a bridging conductor to connect two fixed terminals 244 which are mounted on the adjustable frame 224. For this purpose the conductor 242 carries two contact elements 246 to engage the fixed terminals 244 so as to close the electric circuit. The terminals 244 are connected into the circuit in a preferred manner such as that hereinbefore described in connection with the terminals shown in Figures 3 and 4. A tension spring 248 is connected between the frame 224 and the lever 220 tending to press the contact elements 246 against the terminals 244.

When in use, the expansion elements 202 and 204 are exposed to the heat of the object such as a ladle, oven or the like, the temperature of which is to be regulated, the parts above or outside of the base 200 being at a cooler position. As the temperature rises, the high expansion element 204 expands, forcing the bearing element 218 downward against the horizontal arm of the lever 216 so that the latter is swung toward the left as shown in Figure 14. This eventually results in the rocking of the lever 220 about its pivot 222 so as to break the connection between the contact points 246 carried by the lever 220 and the corresponding fixed terminals 244 carried by the frame 224. Adjustment of the temperature to which the device will operate is made by turning the finger piece 238 to raise or lower the adjusting screw 232. This rocks the frame 224 about its supporting points 226 and results in the movement of the lever 220 toward or from the upper end of the lever 216, thus altering the point to which the lever 216 operates to run the lever 220.

I claim:

1. A thermostat comprising two elongated metal members with substantial surface areas resiliently pressed together in mutual sliding contact, said members having different coefficients of linear thermal expansion, means securing said members together near one end thereof, a bearing element movable with the free end of each said member, a rocking lever operatively engaged by said bearing elements to rock in response to unequal longitudinal expansion of said members, and a control device operable by rocking movement of said lever.

2. A thermostat comprising two elongated metal members with substantial surface areas resiliently pressed together in mutual sliding contact, said members having different coefficients of linear thermal expansion, means securing said members together near one end thereof whereby similar changes of temperature of said members result in different extents of axial movement of the free ends of said members, an electric switch, and means operable by expansion of the member having the higher coefficient to open said switch.

3. A thermostat comprising two elongated metal members with substantial surface areas resiliently pressed together in mutual sliding contact, said members having different coefficients of linear thermal expansion, means securing said members together near one end thereof, a bearing element on each said member near the other end thereof, a rocking lever engaged by said bearing elements at points on opposite sides of the lever and in a plane which is substantially at right angles to the axis of said members, and a control device operable by rocking movement of said lever.

4. A thermostat comprising two elongated metal members having a substantial area of sliding interfacial contact, said members having different coefficients of linear thermal expansion, means securing said members together near one end thereof, an extension on the free end of one said member adjustable to vary the effective overall length of the member, a bearing element at the end of said extension, a second bearing element at the end of the other said member, a rocking lever operatively engaged by said bearing elements to rock in response to unequal expansion of said members, and a control device operable by rocking movement of said lever.

5. A thermostat comprising two elongated members secured together near one end thereof in face to face contact and made of metals having different coefficients of linear thermal expansion, an extension on the free end of one said member adjustable to vary the effective overall length of the member, means operable to adjust said extension and including a rigid stop effective when said means is at any setting to prevent relative movement of said extension to decrease the overall length of the extension and its member, said means also including a yielding stop to oppose relative movement of the extension to increase said overall length, a bearing element at the end of said extension, a second bearing element at the free end of the other said member, a rocking lever operatively engaged by said bearing elements, and a control device operable by rocking movement of said lever.

6. A thermostat comprising two elongated members secured together near the lower end thereof in face to face contact and made of metals having different coefficients of linear thermal expansion, a knife edge bearing element at the upper end of the member having the higher coefficient of expansion and directed upward, a second knife-edge bearing element near the upper end of the member having the lower coefficient of expansion and directed downward, said knife-edges being normally in a plane perpendicular to the longitudinal axis of said members, an L-shaped rocking lever with a horizontal short arm engaged by said knife edge bearing elements below and above respectively, said lever having a downwardly extending long arm, and a control device operable by movements of the free end of said long arm toward or from the plane of said members as the lever rocks.

7. A thermostat comprising two elongated members secured together near an end thereof in face to face contact and made of metals having different coefficients of linear thermal expansion, bearing elements at the free ends of said members, a rocking lever operatively engaged by said bearing elements to rock in response to different longitudinal expansion of said members, a bridging conductor carried by said lever and movable therewith, two contact points mounted on said conductor, two fixed contact points mounted in position for engagement by the contact points carried by said bridging conductor, and means for relatively adjusting the contact points on said conductor for simultaneous touching thereof with the respective fixed points.

8. A thermostat comprising a frame, an elongated metal member secured near its upper end to said frame and projecting down therefrom, a second elongated metal member secured to the first said member at a point near the lower end of both members and in face to face sliding contact with a substantial portion of said first member, means spaced substantially above the secured ends of said members resiliently pressing said members against each other, the metals in said members having different coefficients of linear thermal expansion, an extension on the upper end of the first said member, means carried by the frame for adjusting the extension to vary the effective overall length of said first member, a downwardly directed bearing element at the upper end of said extension, an upwardly directed bearing element at the upper end of the second member, a rocking lever having one end portion engaged between said bearing elements to be rocked in response to unequal expansion of said members, and an electric switch operable by movements of said rocking lever.

9. A thermostat comprising a frame, an outer tubular member secured at its upper end to said frame and projecting down therefrom, an inner tubular member nested within said outer member and longitudinally slotted for sliding interfacial resilient pressure between the members without binding, means securing the lower ends of said members to each other, said outer and inner members being of metals having respectively high and low coefficients of linear thermal expansion, a bracket on said frame having a bearing element at its upper end, a second bearing element on the upper end of said inner member, and a rocking lever operatively engaged by said bearing elements.

10. A thermo-responsive device comprising two elongated metal members with substantial surface areas resiliently pressed together in mutual sliding contact, said members having different coefficients of linear thermal expansion, means securing said members together near one end thereof whereby similar changes of temperature of said members result in different extents of axial movement of the free ends of said members, and means operable by relative movement of said free ends.

11. A thermo-responsive device comprising: two elongated metal members having different coefficients of linear thermal expansion and extensive surface areas resiliently pressed together in mutual sliding contact; means securing said members together adjacent one end thereof whereby similar changes of temperature of said members result in different extents of axial movement of the other and free ends of said members; a plate secured to said free end of one of said members and having a knife edge facing longitudinally thereof; a plate secured to said free end of the other of said members and having a knife edge in opposition to said first-mentioned knife edge, the knife edges of said plates being disposed in a plane extending substantially perpendicularly of said plates and said knife edges being spaced apart in said plane a distance not greater than the combined thickness of said plates; and a lever engaged between said knife edges for rocking movement by relative longitudinal movement between said free ends of said members.

12. A thermo-responsive device comprising: two elongated metal members having different coefficients of linear thermal expansion and extensive surface areas resiliently pressed together in mutual sliding contact; means securing said members together adjacent one end thereof whereby similar changes of temperature of said members result in different extents of axial movement of the other and free ends of said members; means defining a plate secured to said free end of one of said members and having a knife edge facing away from the said secured end of said one member; means defining an apertured plate secured to said free end of the other of said members in sliding engagement with said first-mentioned plate, an edge of the aperture in said apertured plate having a knife edge opposed to the knife edge of said first-mentioned plate, and the knife edges of both said plates being disposed in a plane extending substantially perpendicularly of said plates; and a lever engaged between said knife edges for rocking movement by relative longitudinal movement between said free ends of said members.

References Cited in the file of this patent

UNITED STATES PATENTS

| Number | Name | Date |
|---|---|---|
| 830,278 | Albrecht | Sept. 4, 1906 |
| 1,025,576 | Kirkwood | May 7, 1912 |
| 1,143,573 | Denhard | June 15, 1915 |
| 1,902,451 | Johnson | Mar. 21, 1933 |
| 1,992,047 | Spencer | Feb. 19, 1935 |
| 2,019,293 | Carpenter | Oct. 29, 1935 |
| 2,516,501 | Altman et al. | July 25, 1950 |
| 2,516,502 | Altman et al. | July 25, 1950 |